(12) United States Patent
Goyal et al.

(10) Patent No.: US 12,158,528 B2
(45) Date of Patent: Dec. 3, 2024

(54) PLANT AND/OR VEHICLE LOCATING

(71) Applicant: Zimeno, Inc., Livermore, CA (US)

(72) Inventors: Sanket Goyal, Pleasanton, CA (US); Christopher Travis Whitney, Palo Alto, CA (US)

(73) Assignee: Zimeno Inc., Livermore, CA (US)

( * ) Notice: Subject to any disclaimer, the term of this patent is extended or adjusted under 35 U.S.C. 154(b) by 437 days.

(21) Appl. No.: 17/490,176

(22) Filed: Sep. 30, 2021

(65) Prior Publication Data

US 2023/0095661 A1    Mar. 30, 2023

(51) Int. Cl.
*G01S 19/00* (2010.01)
*G01S 19/14* (2010.01)
*G06V 20/56* (2022.01)
*G06V 30/194* (2022.01)
*A01G 7/00* (2006.01)

(52) U.S. Cl.
CPC .............. *G01S 19/14* (2013.01); *G06V 20/56* (2022.01); *G06V 30/194* (2022.01); *A01G 7/00* (2013.01)

(58) Field of Classification Search
CPC . G01S 19/14; G01S 5/16; G01S 11/12; G06V 20/56; G06V 30/194; G06V 10/25; G06V 10/774; G06V 10/82; A01G 7/00; A01G 17/00; G06T 2207/20081; G06T 2207/20084; G06T 2207/30252; G06T 7/536; G06T 7/73
See application file for complete search history.

(56) References Cited

U.S. PATENT DOCUMENTS

| 6,278,918 B1 | 8/2001 | Dickson et al. |
| 6,385,515 B1 | 5/2002 | Dickson et al. |
| 6,686,951 B1 | 2/2004 | Dickson et al. |

(Continued)

FOREIGN PATENT DOCUMENTS

| EP | 1906374 | 2/2008 |
| EP | 3818799 A1 | 5/2021 |

(Continued)

OTHER PUBLICATIONS

PCT International Search Report dated Feb. 10, 2022 for PCT/US2021052803.

*Primary Examiner* — Ping Y Hsieh
*Assistant Examiner* — Xioa Liu
(74) *Attorney, Agent, or Firm* — Rathe Lindenbaum LLP

(57) ABSTRACT

A plant locating system may include a vehicle supporting a Global Positioning System (GPS) antenna and a monocular camera. The system may further include a plant locating unit comprising a processing unit and a non-transitory computer-readable medium containing instructions to direct the processing unit to: acquire a sample image of a plant of interest captured at a time with the monocular camera at an unknown distance from the plant of interest (POI); determine a geographic location estimate of the GPS antenna at the time; identify a selected portion of the sample image comprising the POI; determine a distance between the POI and the monocular camera based upon the selected portion; and determine a geographic location estimate of the POI based on the geographic location estimate of the GPS antenna at the time and the determined distance between the monocular camera and the POI.

21 Claims, 8 Drawing Sheets

(56) References Cited

U.S. PATENT DOCUMENTS

| | | | |
|---|---|---|---|
| 6,721,453 B1 | 4/2004 | Benson et al. | |
| 7,080,498 B2 | 7/2006 | Etcheverry | |
| 7,400,957 B2 | 7/2008 | Hofer et al. | |
| 7,765,780 B2 | 8/2010 | Koselka et al. | |
| 7,854,108 B2 | 12/2010 | Koselka et al. | |
| 8,381,501 B2 | 2/2013 | Koselka et al. | |
| 9,298,991 B2* | 3/2016 | Dolinar | E01C 23/163 |
| 9,313,951 B2* | 4/2016 | Herman | B60R 1/00 |
| 10,672,138 B2 | 6/2020 | Germain et al. | |
| 10,679,056 B2 | 6/2020 | Zemenchick | |
| 10,784,841 B2 | 9/2020 | Bermemeier et al. | |
| 10,874,044 B2 | 12/2020 | Cavender-Bares | |
| 11,237,563 B2 | 2/2022 | Javault et al. | |
| 2006/0012673 A1 | 1/2006 | Koselka et al. | |
| 2020/0029489 A1* | 1/2020 | Bertucci | A01B 69/008 |
| 2020/0066034 A1 | 2/2020 | Tham et al. | |
| 2021/0144903 A1 | 5/2021 | Javault et al. | |
| 2021/0158041 A1* | 5/2021 | Chowdhary | G05D 1/0246 |
| 2022/0121847 A1* | 4/2022 | Sibley | A01B 79/02 |

FOREIGN PATENT DOCUMENTS

| | | |
|---|---|---|
| EP | 2954772 B2 | 7/2021 |
| FR | 2881608 B1 | 5/2012 |

\* cited by examiner

PLANT AND/OR VEHICLE LOCATING

BACKGROUND

Plants are often grown in fields, orchards, vineyards and the like. Customized care and management of individual plants or individual portions of a field, orchard or vineyard is challenging. Such customized care and management is especially challenging where such care and management is carried out in an automated fashion.

Figure 1:
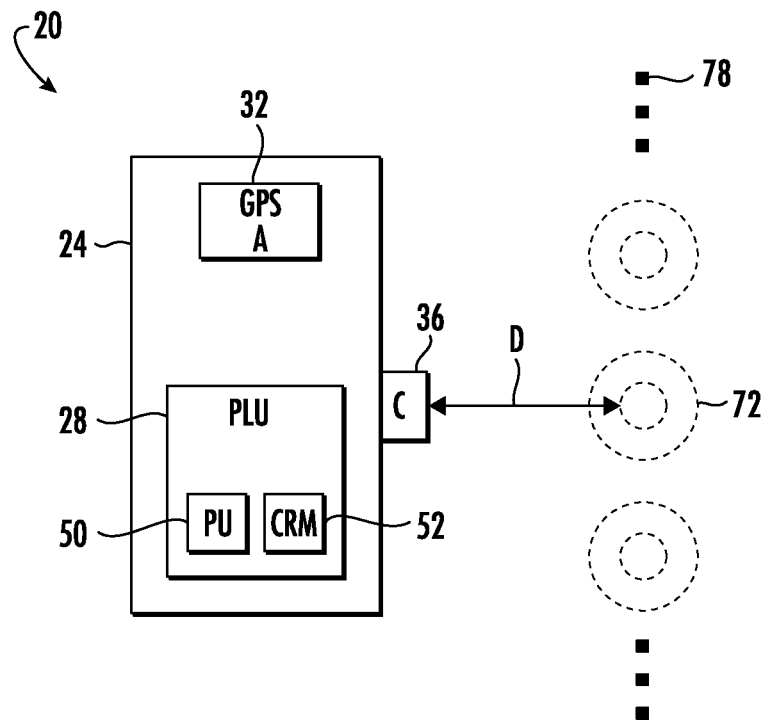
FIG. 1 is a diagram schematically illustrating portions of an example plant locating system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example plant locating systems, methods and computer-readable mediums that facilitate the automated locating and mapping of individual plants to facilitate automated customized care and management of the individual plants. The example plant locating systems, methods and computer-readable mediums may further facilitate automated locating and mapping of the ends of rows and the rows themselves. Disclosed are example vehicle locating systems, methods and computer-readable mediums that facilitate the determination of the geographic location of a vehicle based upon the determined geographic location or position of an individual plant.

The example plant locating systems, methods and computer-readable mediums locate and map the geographic location or coordinates of an individual plant by acquiring a sample image of a plant of interest captured at a time with the monocular camera at an unknown distance from the plant of interest. A geographic location estimate of the GPS antenna or the vehicle at the time is determined. A selected portion (less than whole) of sample image comprising the plant of interest is identified. The distance between the plant of interest and the monocular camera is determined based upon characteristics of the selected portion. For example, a distance and direction from the monocular camera to the individual plant may be estimated based upon a size and/or shape of the selected portion and/or the coloring or number of pixels within the selected portion, the number of pixels forming the trace that comprises selected portion, the number of pixels outside the selected portion or the like. The selected portion may comprise a window which encloses the individual plant or a portion of the individual plant, an outline which traces portions of the individual plant or other portions of the sample image.

In some implementations, the example plant locating systems, methods and computer-readable mediums utilize a processing unit that is programmed or trained to reliably generate, form or define the selected portion in the sample image. For example, in some implementations, the example plant locating systems, methods and readable mediums utilize or are part of a neural network that learns how to define the selected portion of the sample image based upon a series of training images. The training images may comprise images of the same type of plant being targeted for the locating and mapping, wherein each of the training images is provided with a human defined or computer defined training portion.

From the series of training images with the human defined or computer defined training portion, the neural network may identify common features, factors or criteria with respect to human defined or computer defined training portion so as to use the same criteria to select a corresponding selected portion of the sample image. For example, the neural network may identify particular pixel colors, densities, clusters, boundaries, shadings, lighting or the like common amongst human defined or computer defined training portions in the training images and then, through optical analysis, identify those portions of the sample image having the same characteristic pixel colors, densities, clusters, boundaries, shadings, lighting or the like and identify the selected portion of the sample image comprising the plant of interest.

In some implementations, the example plant locating systems, methods and computer-readable mediums may record the identified geographic location estimate of the plant of interest for subsequent use. The recorded location of the plant of interest may be used to carry out customized care and management of the plant of interest. When a tractor or other vehicle is adjacent to the previously identified location of the plant of interest, based upon the location of the vehicle from GPS signals or other locating methods for the vehicle, particular management or other operations may be carried out on the individual plant of interest. For example, the plant of interest may receive customized amounts or types of herbicide, insecticide, fertilizer, irrigation, tillage and the like. The plant of interest may receive customized pruning, harvesting operations of the like based upon particular characteristics of the plant of interest based upon the particular type or species the plant of interest or as determined from other data obtained regarding the plant of interest from vehicle mounted cameras, satellite images or the like. Each individual plant in a vineyard, orchard or field may receive a different customized treatment in an automated fashion.

In some implementations, the mapped location of each individual plant may be specifically used to determine or verify the location of the vehicle as the vehicle moves through the vineyard, orchard or field during those times that other mechanisms for locating the vehicle are not available such as when GPS signals are temporarily not available. For example, the example vehicle locating systems may identify a particular individual plant and its associated or mapped geographic location. In some implementations, the selected portion and a sample image of the plant having the known geographic location may be identified, wherein characteristics of the selected portion may then be optically analyzed to determine the distance and direction between the monocular camera and the plant of interest having the previously identified and mapped geographic location. Based upon such information, the geographic location of the monocular camera as well as the geographic location of the tractor itself may be determined.

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

Disclosed is an example plant locating system. The plant locating system may include a vehicle supporting a Global Positioning System (GPS) antenna and a monocular camera. The system may further include a plant locating unit comprising a processing unit and a non-transitory computer-readable medium containing instructions to direct the processing unit to: acquire a sample image of a plant of interest captured at a time with the monocular camera at an unknown distance from the plant of interest (POI); determine a geographic location estimate of the GPS antenna at the time; identify a selected portion of the sample image comprising the POI; determine a distance between the POI and the monocular camera based upon the selected portion; and determine a geographic location estimate of the POI based on the geographic location estimate of the GPS antenna at the time and the determined distance between the monocular camera and the POI.

Disclosed is an example plant locating method. The example plant locating method may include: (1) acquiring a sample image of a plant of interest captured at a time with a monocular camera supported by vehicle at an unknown distance from a plant of interest; (2) determining a geographic location estimate of the GPS antenna at the time; (3) identifying a selected portion of the sample image comprising the plant of interest; (4) determining a distance between the plant of interest and the monocular camera based upon the selected portion; and (5) determining a geographic location estimate of the plant of interest based on the geographic location estimate of the GPS antenna at the time and the determined distance.

Disclosed is an example non-transitory computer-readable medium containing instructions to direct the processor locate an individual plant. The instructions may comprise: (1) sample image acquisition instructions to acquire a sample image of a plant of interest captured at a time with the monocular camera at an unknown distance from the plant of interest; (2) GPS antenna locating instructions to determine a geographic location estimate of the GPS antenna at the time; (3) image analysis instructions to identify a selected portion of the sample image comprising the plant of interest; (4) distance determining instructions to identify a distance between the monocular camera and the plant of interest based upon the selected portion; and (5) plant locating instructions to determine a geographic location estimate of the plant of interest based on the geographic location estimate of the GPS antenna at the time and the determined distance between the monocular camera and the plant of interest.

Disclosed is an example vehicle locating method. The method may include acquiring at least one image of a plant having a geographic position estimate, the at least one image being captured at a time by a camera carried by a vehicle, and determining a geographic location estimate of the vehicle for the time based on the geographic position estimate of the plant.

Disclosed an example vehicle locating system. The example vehicle locating system may include a vehicle supporting a camera and a vehicle locating unit. The vehicle locating unit may comprise a processing unit and a non-transitory computer-readable medium containing instructions to direct the processing unit to acquire at least one image of a plant captured by the camera and having a geographic position estimate, and to determine a geographic location estimate of the vehicle based on the geographic position estimate of the plant.

FIG. 1 is a diagram schematically illustrating portions of an example plant locating system 20. Plant locating system 20 may facilitate the automated locating and mapping of individual plants to facilitate automated customized care and management of the individual plants. Plant locating system 20 comprises vehicle 24 and plant locating unit 28.

Vehicle 24 is configured to traverse through a region containing plan such as a vineyard, orchard or field. In some implementations, vehicle 24 may comprise a tractor. In other implementations, vehicle 24 may comprise other forms of a vehicle. In some implementations, vehicle 24 is self-propelled. In other implementations, vehicle 24 is pushed or towed by another vehicle. Vehicle 24 comprises and supports a global positioning system (GPS) antenna 32 and a monocular camera 36.

GPS antenna 32 (also sometimes referred to as global navigation satellite system (GNSS) antenna) receives and expands radio signals sent by distinct frequencies from a GPS or GNS system. The signals are converted into electronic signals that are used by an associated GPS receiver to determine the geographic location, such as longitudinal and latitudinal coordinates, of the GPS antenna.

Monocular camera 36 is mounted to or carried by vehicle 24 so as to face in a sideways direction from vehicle 24. The term "sideways" refers to a direction facing away from sides of vehicle 24, wherein the sides of vehicle 24 generally extend in planes perpendicular to the straight direction of travel of vehicle 24 (such as when front and rear axles are parallel). Monocular camera 36 is mounted so as to face the sides of rows of plants or so as to face the ends of rows of plants in a vineyard, orchard or field. In contrast to a stereo camera, a monocular camera is a single-eyed system and generally less expensive and less complex than a stereo camera. In contrast to a stereo camera, monocular camera 36 may lack the ability to, by itself, detect or measure the distances of objects from the camera.

In some implementations, plant locating system 20 is configured for locating individual plants based upon the stem of such plants. For example, in some implementations, plant locating system 20 is configured to locate or map the location of a stem of an individual vine. In such implementations, monocular camera 36 is supported at a height no greater than 110 cm above the underlying terrain or above the lowest ground contacting point of vehicle 24. At this height, monocular camera 36 may capture a sample image that is focused on a stem (the portion extending from the crown at ground level to the branches) of an individual plant of interest without the crown overly obstructing a view of the stem. In some implementations where plant locating system 20 is configured to locate or map other species or types of individual plants, monocular camera 36 may be supported by vehicle 24 at other heights.

Plant locating unit 28 uses data, signals or information from GPS antenna 32 and camera 36 to identify the geographical coordinates (geographical location of a plant of interest). Plant locating unit 28 comprises processing unit 50 and a non-transitory computer-readable medium 52. Processing unit 50 follows instructions contained in medium 52.

Figure 2:
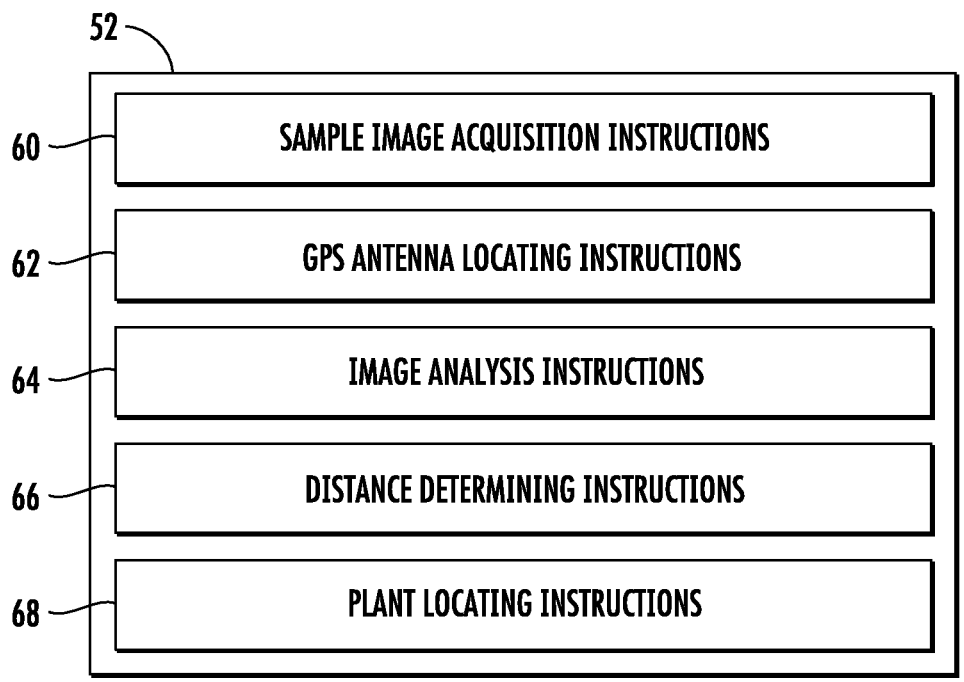
FIG. 2 is a diagram magically illustrate portions of an example non-transitory computer-readable medium of the example plant locating system of FIG. 1.

Non-transitory computer-readable medium 52 comprise a persistent storage device storing recorded instructions for processing unit 30. Examples of medium 52 include, but are not limited to, solid-state memory (flash memory), disk memory and the like. As shown by FIG. 2, medium 52 comprises sample image acquisition instructions 60, GPS antenna locating instructions 62, image analysis instructions 64, distance determining instructions 66 and plant locating instructions 68. Instructions 60-68 direct processing unit 50 to carry out the example plant locating method 100 outlined in FIG. 3.

Figure 3:
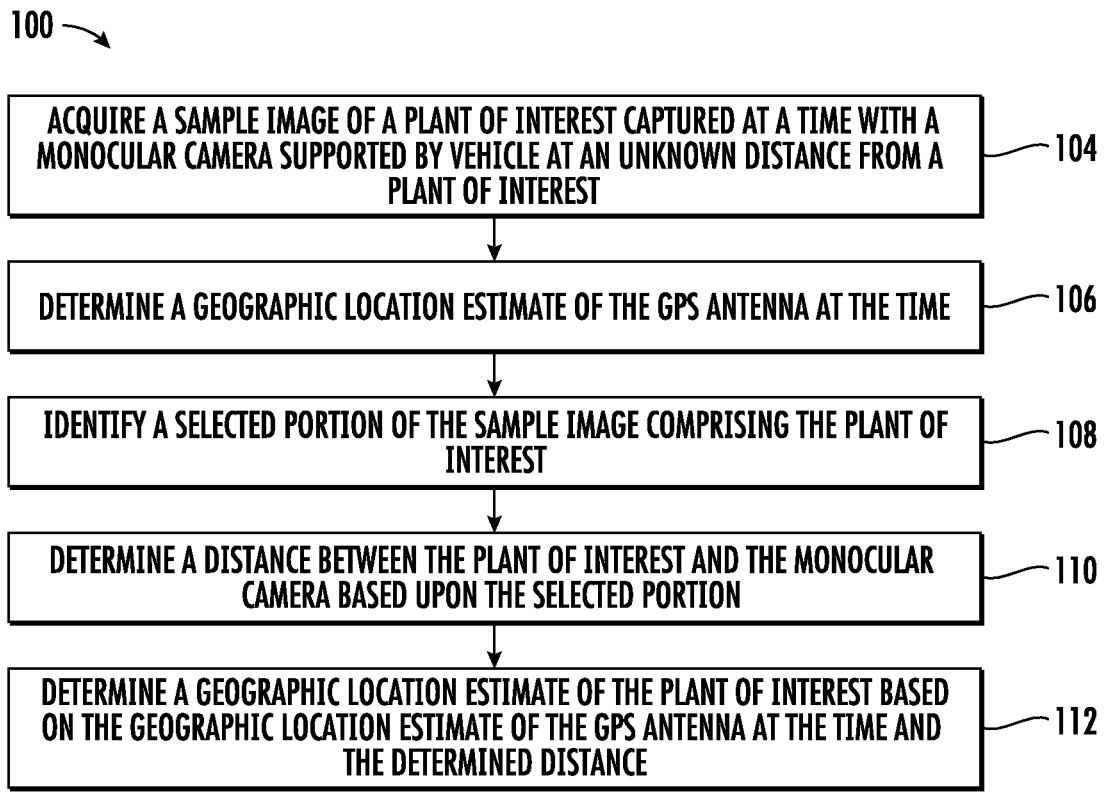
FIG. 3 is a flow diagram of an example plant locating method.
Figure 4:
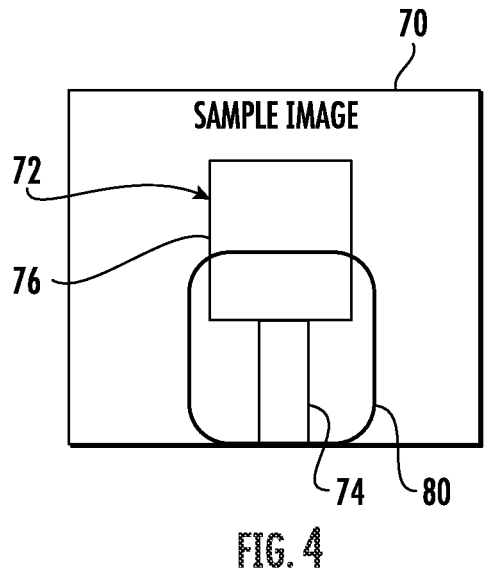
FIG. 4 is a diagram schematically illustrating portions of an example sample image captured by the example plant locating system of FIG. 1.

As indicated by block 104 of method 100 in FIG. 3, sample image acquisition instructions 60 direct processing unit 50 to acquire a sample image 70 (shown in FIG. 4) of a plant of interest 72 (shown in FIGS. 1 and 4) at a time with monocular camera 36 which is supported by vehicle 24 at an unknown distance from the plant of interest 72. In the example illustrated, the plant of interest 72 (schematically illustrated) comprises a stem 74 and a crown of branches 76. In the example illustrated, the plant of interest 72 forms part of a row 78 of other plants. In some implementations, the rows may be made of rows of a single species or type a plant. In other instances, the rows may comprise multiple different types or different species or varieties of plants. In some implementations, the different plants in row 78 may be at different growth stages. Moreover, the different plants in row 78 may be growing under different conditions, such as different soil types, moisture levels or the like.

As indicated by block 106 of method 100 in FIG. 3, GPS antenna locating instructions 62 direct processing unit 50 to determine a geographic location estimate of the GPS antenna 32 at the time, the same time at which the sample image was acquired. Such a determination may involve acquiring signals from GPS antenna 32 and then extrapolating the geographical coordinates of antenna 32. In some implementations, the determined geographic coordinates of GPS antenna 32 may further be transformed or translated to a base link of vehicle 24 which serves as the origin in a coordinate system for the position of vehicle 24. In some implementations, the base link is a center of the rear axle of vehicle 24. In other implementations, such translation of the geographic coordinates or location of antenna 32 may be omitted.

As indicated by block 108 of method 100 in FIG. 3, image analysis instruction 64 direct processing unit 50 to identify a selected portion 80 of the sample image 70 comprising or encompassing the plant of interest 72. In the example illustrated, the selected portion 80 comprises a window or closed loop that extends about particular portion of sampling image 70, wherein the selected portion 80 is less than the whole of sample image 70. The selected portion 80 may be defined so as to cover, overlay, surround or enclose particular content of sample image 70. The selected portion 80 may be defined so as to enclose, extend over, extend within or overlay particular predefined portions or features shown in sample image 70. In the example illustrated, selected portion 80 is generated or defined so as to encompass the stem 74 and a junction of stem 74 and crown 76. Although the example selected portion 80 is shown as a generally rectangular loop enclosing the predefined features, in other implementations, selected portion 80 may comprise a window having other shapes and may enclose additional or other features. In other implementations, rather than enclosing selected features, selected portion 80 may have a size and shape that matches the size and shape of the selected features. In some implementations, selected portion 80 may trace a perimeter of the selected features.

In some implementations, processing unit 50 carries out image analysis by analyzing the number of pixels, color or shading of pixels, the clustering of pixels and the like. In some implementations, processing unit 50 utilizes such analysis to define the size and/or shape of selected portion 80. In some implementations, the particular predefined features that define where selected portion 80 is located, its size and/or shape may be predefined and programmed.

In some implementations, plant locating unit 28 to be part of a neural network that "learns" the predefined features or criteria that define the location and configuration of selected portion 80 from a set of training images, wherein each of the training images comprise a training portion that has a location, size and/or shape based upon features in the training image. For example, different training images may depict the same training plant under different lighting conditions or from different angles, wherein a selected portion of the training image is encompassed by the training portion. Different training images may depict different training plants at the same or different stages of growth and at different distances or vectors from the camera that capture the training image, wherein a selected portion of the training image is encompassed by the training portion. The processing unit 50, forming part of a neural network, learns how to generate and configure a selected portion in a sample image from all the different training images and the human or computer-generated training portions in each training image. The processing unit, as part of the neural network, learns, from the training images, the common criteria used for configuring the training portions and applies the same criteria when configuring a selected portion 80 in a sample image 70.

As indicated by block 110 of method 100 in FIG. 3, distance determining instructions 66 direct processing unit 50 to determine a distance (and possibly a direction or vector) between the plant of interest 72 and the monocular camera 36 based upon the selected portion 80. In some implementations, the distance (which may include the direction) is determined by processing unit 50 evaluating characteristics of selected portion 80. Such characteristics may include, but are not limited to, the size of selected portion 80, the number of pixels encompassed by or forming selected portion 80 and/or, in some implementations, the shape of selected portion 80. In some implementations, the selected portion name may have a predefined constant shape amongst different sample images, wherein the distance and possibly direction of the plant of interest 72 from the camera 36 is determined based upon the size of the selected portion 80 and the number of pixels of image 70 within selected portion 80.

As indicated by block 112 of method 100 in FIG. 3, plant locating instructions 68 direct process unit 50 to determine a geographic location estimate (an estimate of the geographic coordinates, e.g., longitude and latitude) of the plant of interest 72 based upon both the geographic location estimate for the GPS antenna 32 (determined in block 106) at the time and the determined distance (and possibly the determined direction) (determined in block 110). For example, given the determined geographic coordinates of GPS antenna 32 at the time that the sample image 70 with captured by camera 36, the generally fixed and known positioning of camera 36 relative to antenna 32, and the determined distance D (shown in FIG. 1) between camera 36 and the plant of interest 72, processing unit 50 may calculate the geographic location or geographic coordinates of the plant of interest 72.

In some implementations, the geographic location the plant of interest 72 is based upon the geographic location of particular selected or predefined portions of the plant of interest 72. For example, in circumstances where the plant of interest 72 has a stem 74 and a crown or head 76, such as with a vine or a tree, the geographic location of the plant of interest 72 may be based upon the geographic location of the stem 74. Stem 74 may provide a more precise and consistent feature for defining the geographic location of the plant of interest 72. Crowns or heads may have differing extents and different shapes, whereas stem 74, rising from the underlying ground, is generally straight and provides more consistent indication of the location of the plant of interest 72 relative to other plants in rows 78.

As discussed above, in the example illustrated, camera 36 may be supported at a height so as to facilitate the capture of stem 74, the basal end of stem 74 where the stem rises from the underlying ground to where the plant branches outwardly from the stem to form the crown 76. In such implementations where the plant of interest 72 comprises a vine, camera 36 may be supported at a height no greater than 110 cm above the ground or above the lowest ground contacting point of vehicle 24, wherein camera 36 faces in a general direction parallel to the ground surface and parallel to the axles of vehicle 24. In other implementations, camera 36 may be supported at other heights and at other relative angles with respect to the axles of vehicle 24.

Upon determining the geographic location or coordinates of the plant of interest 72, plant locating unit 28 may record the geographic location of plant 72 for subsequent customized and automated management and care of the plant of interest 72. When vehicle 24 or a different vehicle (ground supported or airborne) is adjacent to the previously identified location of the plant of interest, based upon the location of the vehicle from GPS signals or other locating methods for the vehicle, particular management or other operations may be carried out on the individual plant of interest 72. For example, the plant of interest 72 may receive customized amounts or types of herbicide, insecticide, fertilizer, irrigation, tillage and the like. The plant of interest 72 may receive customized pruning, harvesting operations or the like based upon particular characteristics of the plant of interest based upon the particular type or species the plant of interest or as determined from other data obtained regarding the plant of interest from vehicle mounted cameras, satellite images or the like. Each individual plant in a vineyard, orchard or field may receive a different customized treatment in an automated fashion.

Figure 5:
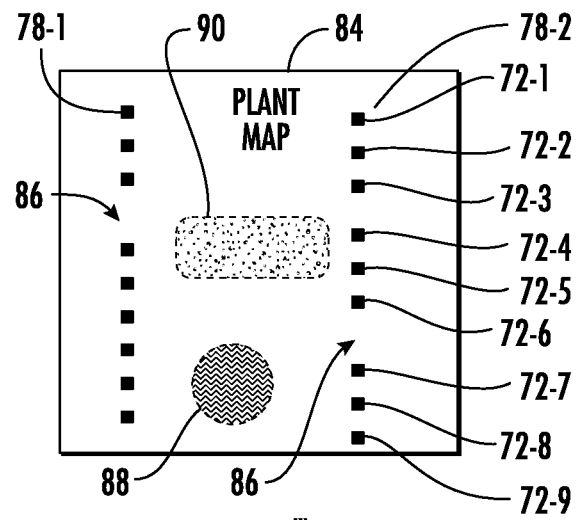
FIG. 5 is a diagram schematically illustrating an example plant map.

In some implementations, plant locating unit 28 may continuously determine and record the geographic coordinates or locations of multiple plants as vehicle 24 moves or passes through the orchard, vineyard or field. Plant locating unit 28 may use the recorded locations to form a plant map 84, an example of which is shown in FIG. 5. The plant map 284 may be specifically used to automatically control the navigation of vehicle 24 or other vehicles between the plants, such as between consecutive rows 78-1 and 78-2. As noted above, the plant map 284 may be used to provide customized and automated care and management of individual plants in each of rows 78-1 and 78-2. Adjacent plants 72 in the same row may be individually monitored, sensed and distinguished using data captured by cameras or other sensors carried by vehicle 24 or acquired by other vehicles, either ground-based or airborne. Based upon the different attributes of the adjacent plants in the same row, the adjacent plants may receive different treatment customized to their particular condition, species, type or stage of growth.

In some implementations, plant locating unit 28 or other computer systems may utilize the mapped geographic coordinates of plants 72 to identify gaps 86 in rows 78. Such gaps 86 may be the result of missed planting or the result of the prior plant not surviving. Plant locating unit 28 may identify such a gap 86 by identifying an average or pattern of spacings between consecutive plants 72 in a row, wherein locations where the general pattern of plant locations is broken or where two consecutive plants are spaced by a distance greater than a predefined threshold (such as greater than the average spacing plus some tolerance) are determined to be a gap 86. A crop manager may be notified of the geographic location or coordinates of each of gaps 86 such that a crop manager may carry out remedial action such as replanting in the gap 86. In some circumstances, the crop manager may utilize the identified gap 86 to cease or adjust the application of herbicide, insecticide, fertilizer, water or the like at the particular gap 86.

As further shown by FIG. 5, as vehicle 24 is moving through a region of plants 72 and determining their individual particular geographic coordinates or locations, vehicle 24 may be gathering additional information regarding the surrounding orchard, vineyard or field conditions with sensors such as cameras and the like. Plant location unit 28 may associate such detected plant condition with those plants 72 proximate to such areas. As a result, plant location unit 28 may further map particular areas of a field, orchard or vineyard having particular identified conditions. In the example illustrated, plant map 84 additionally includes or maps a wet region 88 and a weed infested region 90. Other conditions may also be map such as soil type, nutrient levels and the like.

Figure 6:
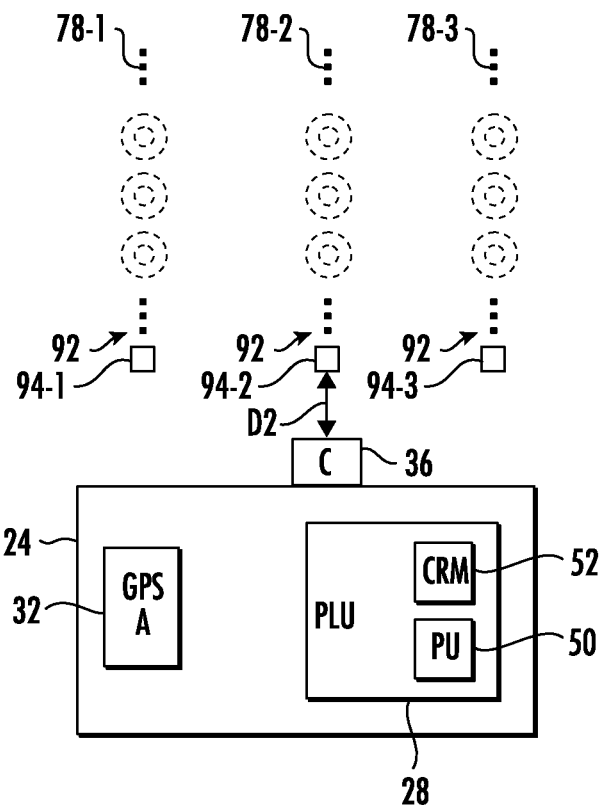
FIG. 6 is a diagram the example plant locating system of FIG. 1 while being used to locate row ends.
Figure 7:
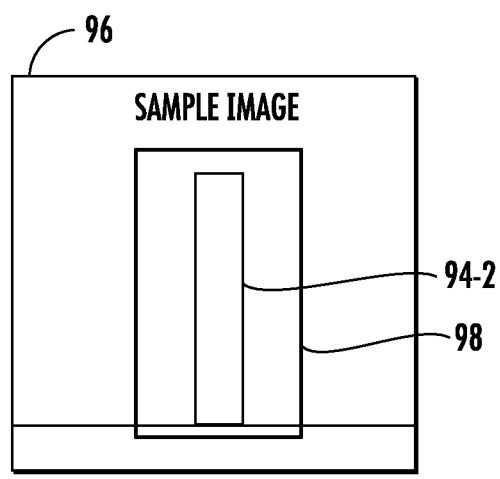
FIG. 7 is a diagram schematically illustrating portions of an example sample image captured by the example plant locating system of FIG. 6.

FIGS. 6 and 7 illustrate an example of how plant locating unit 28 may additionally locate individual rows 78-1, 78-2, 78-3 and so on (collectively referred to as rows 78) and their endpoints 92 in the example illustrated, rows 78 comprise rows of grapevines in a vineyard, wherein the ends of row 78 are marked with poles 94-1, 94-2, 94-3 and so on (collectively referred to as poles 94). As shown by FIG. 6, as vehicle 24 travels along the ends 92 of such rows 78, camera 36 may capture sample images of poles 94 at particular times. At each of such particular times, the location of GPS antenna 32 is further identified or determined.

FIG. 7 illustrates an example sample image 96 taken by camera 36 and including end row pole 94-2. As further show by FIG. 7, plant locating unit 28 may identify selected portion 98 of image 96 in a fashion similar to the selection of selected portion 80 in sample image 70 described above. For example, image analysis instructions 64 may direct processing unit 50 to identify a selected portion 98 of the sample image 96 comprising or encompassing the end row pole 94-2. In the example illustrated, the selected portion 98 comprises a window or closed loop that extends about particular portion of sample image 96, wherein the selected portion 98 is less than the whole of sample image 96. The selected portion may be defined based upon the content of sample image 96 and may be defined so as to enclose, extend over, extend within or overlay particular predefined portions or features shown in image 96. In the example illustrated, select portion 98 encompasses the base and end of a pole 94-2. Although the example selected portion 98 is shown as a generally rectangular loop enclosing the predefined features, in other implementations, selected portion 80 may comprise a window having other shapes and may enclose additional or other features. In other implementations, rather than enclosing selected features, select portion 98 may have a size and shape that matches the size and shape of the selected features. In some implementations, selected portion 98 may trace a perimeter of the selected features.

In some implementations, processing unit 50 carries out image analysis by analyzing the number of pixels, color or shading of pixels, the clustering of pixels and the like to define the size and/or shape of selected portion 98. In some implementations, the particular predefined features that define where selected portion 98 is located, it size and/or shape may be predefined and programmed.

In some implementations, plant locating unit 28 may be part of a neural network that "learns" the predefined features that define the configuration of selected portion 98 from a set of training images, wherein each of the training images comprise a training portion that has a location, size and/or shape based upon features in the training image. For example, different training images may depict the same end row pole under different lighting conditions or from different angles, wherein a selected portion of the training image is encompassed by the training portion. Different trainers may depict different training and row poles at different distances or vectors from the camera that capture the training image, wherein a selected portion of the training images encompassed by the training portion. The processing unit 50, forming part of a neural network, learns how to generate and configure a selected portion in a sample image from all the different training images and the human or computer-generated training portions in each training image. The processing unit, as part of the neural network, learns, from the training images, the common criteria used for configuring the training portions and applies the same criteria when configuring a selected portion 98 in a sample image 96.

Distance determining instructions 66 may direct processing unit 50 to determine a distance (and possibly a direction or vector) between the end row pole 94 and the monocular camera 36 based upon the selected portion 98. In some implementations, the distance (which may include the direction) is determined by processing unit 50 evaluating characteristics of selected portion 80. Such characteristics may include, but are not limited to, the size of selected portion 80, the number of pixels encompassed by or forming selected portion 98 and/or, in some implementations, the shape of selected portion 80. In some implementations, the selected portion name may have a predefined constant shape amongst different sample images, wherein the distance and possibly direction of the end row pole 94-2 from the camera 36 is determined based upon the size of the selected portion 98 in the number of pixels of image 96 within selected portion 98.

Plant locating instructions 68 may direct process unit 50 to determine a geographic location estimate (an estimate of the geographic coordinates, e.g., longitude and latitude) of the end row pole 94 based upon both the geographic location estimate for the GPS antenna 32 (determined in block 106) at the time and the determined distance (and possibly the determined direction) (determined in block 110). For example, given the determined geographic coordinates of GPS antenna 32 at the time that the sample image 96 with captured by camera 36, the generally fixed and known positioning of camera 36 relative to antenna 32, and the determined distance D2's new (shown in 1) between camera 36 and the end row pole, processing unit may calculate the geographic location or geographic coordinates of end row pole 94-2.

Figure 8:
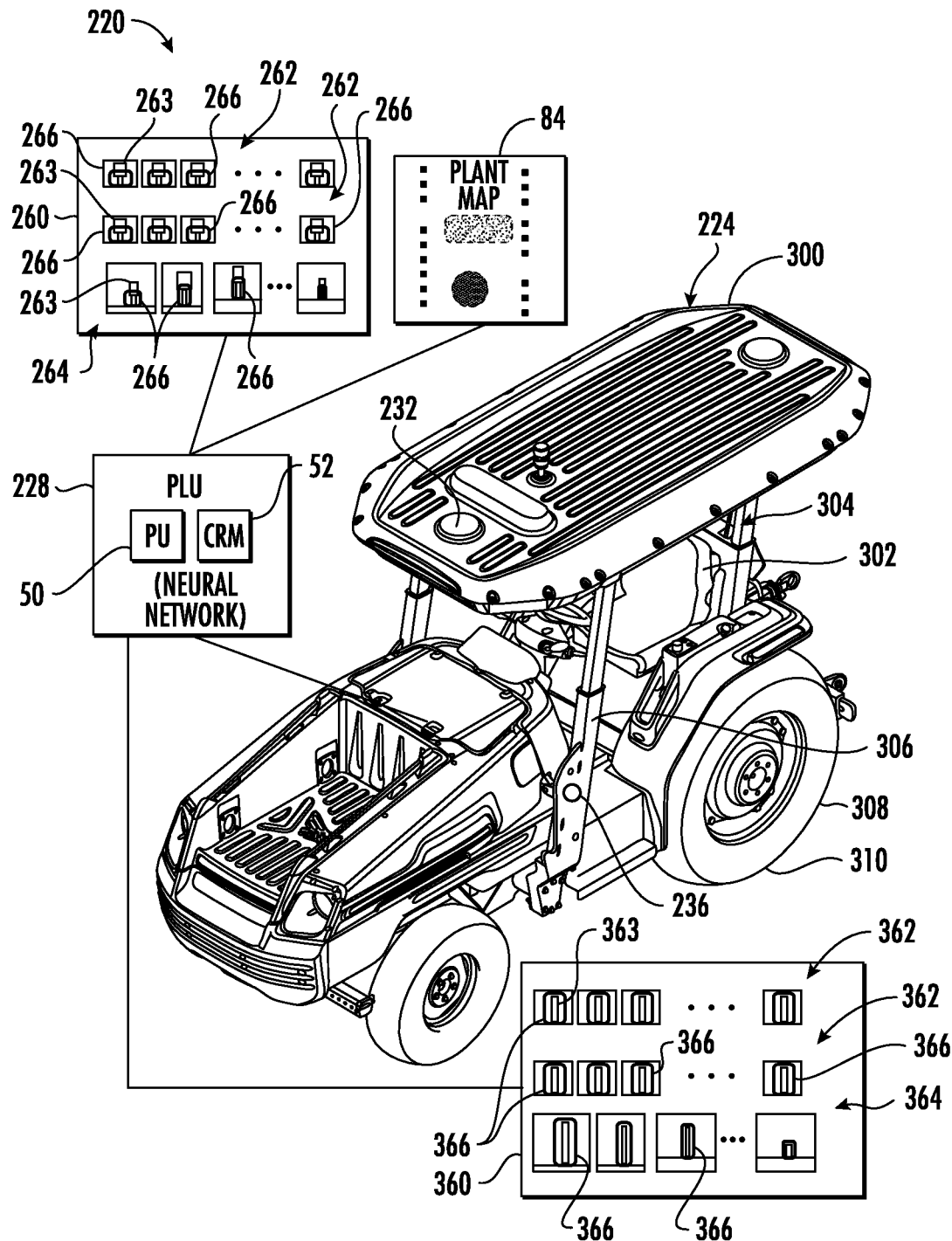
FIG. 8 is a left front perspective view of an example plant locating system including an example tractor.

FIG. 8 illustrates oceans of an example plant locating system 220. Plant locating system comprises a vehicle, in the form of a tractor 224, and a plant locating unit 228. Tractor 224 comprises a GPS antenna 232 and a monocular camera 236. GPS antenna 232 is similar to GPS antenna 32 described above. GPS antenna 232 is mounted or supported on the roof 300 of tractor 224. Roof 300 is supported above a seat 302 to form a cab region 304.

Monocular camera 236 is similar to monocular camera 36 described above. Monocular camera 236 is incorporated into a front left corner post 306 of tractor 224 and faces in a sideways direction generally parallel to the rotational axes of the rear tires 308. Monocular camera 236 extends at a height no greater than 110 cm above the lowest ground contacting point 310 of tractor 224, the bottom of tires 308. As a result, monocular camera 236 is well-suited for capturing the stems of plants, along the sides of tractor 224, that are to be located or mapped.

Plant locating unit 228 is similar to plant locating unit 28 described above. Plant locating unit 228 includes non-transitory computer-readable medium 52 with instructions 60-68 described above for carrying out method 100 (shown in FIG. 3). In the example illustrated, plant locating unit 228 is part of a neural network, wherein plant locating unit 228 has "learned" the predefined features that define the configuration of selected portion 80 from a set of training images, wherein each of the training images comprise a training portion that has a location, size and/or shape based upon features in the training image.

As schematically shown by plant locating unit 228 may utilize a set 260 of training images 262, 264. Different individual training images 262 may depict the same training plant 263 under different lighting conditions or from different angles, wherein a selected portion of the training image is encompassed by the training portion 266. Different individual training images 264 may depict different training plants 263 at the same or different stages of growth and at different distances or vectors from the camera 236 that capture the training image 262, 264, wherein a selected portion of the training image is encompassed by the training portion 266. The processing unit 50, forming part of a neural network, learns how to generate and configure a selected portion 80 in a sample image 70 from all the different training images 262, 264 and the human or computer-generated training portions 266 in each training image 262, 264. The processing unit, as part of the neural network, learns, from the training images, the common criteria used for configuring the training portions and applies the same criteria when configuring a selected portion 80 in a sample image 70 (shown in FIG. 4).

As further shown by FIG. 8, once plant locating unit 228 has carried out method 100 and has determined the geographic location estimate or geographic coordinates for the particular plant of interest, and other plants of interest, plant locating unit 228 may generate and record plant map 84 (described above).

As also described above with respect to FIGS. 6 and 7, plant locating unit 228 may additionally carry out method 100 to locate and map end row poles 94. FIG. 8 schematically illustrates an example set 360 of end row pole training images 362, 363. Different individual training images 362 may depict the same end row pole 363 under different lighting conditions or from different angles, wherein a selected portion of the training image is encompassed by the training portion 366. Different individual training images 364 may depict different end row poles at different distances or vectors from the camera 236 that capture the training image 362, 364, wherein a selected portion of the training image is encompassed by the training portion 366. The processing unit 50, forming part of a neural network, learns how to generate and configure a selected portion 98 in a sample image 96 from all the different training images 362, 364 and the human or computer-generated training portions 366 in each training image 362, 364. The processing unit, as part of the neural network, learns, from the training images, the common criteria used for configuring the training portions and applies the same criteria when configuring a selected portion 98 in a sample image 96 (shown in FIG. 7).

In the example illustrated, plant locating unit 228 is carried by the vehicle in the form of tractor 224. The sets 260 and 360 of training images 262, 264, and 362, 364, respectively, are also carried by the vehicle in the form of tractor 224. In other implementations, one or both of sets 260 and 360 may be located or stored remote from tractor 224, wherein such sets 260 and/or 360 are accessible by plant locating unit 228 in a wireless fashion. For example, sets 260 and/or 360 may be stored in a cloud, wherein access is provided by a server. In such implementations, sets 260 and/or 360 may be shared or made available to multiple different vehicles or multiple different tractors 224 at different locations.

In some implementations, plant locating unit 228 is remote from tractor 224. In such implementations, the location of GPS antenna 232 at individual times and the corresponding sample images captured by camera 236 may be transmitted to the remote plant locating unit 228 in a wireless fashion. In such implementations, the remote location may be provided with enhanced bandwidth and computing capabilities and may carry out plant locating for fleets of different tractors 224 traversing multiple different orchards, fields or vineyards. In some implementations, different portions of plant locating unit 228 may be distributed between first portions carried by the vehicle in the form of tractor 224 and second portions remote from the vehicle in the form of tractor 224. In such implementations, those second portions may be in wireless communication with the vehicle in the form of tractor 224.

For example, in some implementations, the geographic location estimate of the GPS antenna 232 may be locally determined by a processor carried by tractor 224, wherein the identification of the selected portion of the sample image comprising the plant of interest is carried out by a processing unit remote from tractor 224. In such an implementation, the neural network that carries out such identification may be located remote from tractor 224 and may share its capabilities with a fleet of different tractors 224. In such an example implementation the determination of the distance between the plant of interest in the monocular camera and the determination of the geographic location of the plant of interest based on the geographic location estimate of the GPS antenna at the time and the determined distance may be carried out by the processing unit carried by the tractor 224. In other implementations, the different steps identified in blocks 104-112 for locating a plant may carried out by processing units (and associated computer-readable mediums) having other distributions between tractor 224 and remote locations which are in wireless communication with tractor 224. Likewise, the different steps in blocks 104-112, as modified to locate end row poles as described above with respect to FIGS. 6 and 7, may be distributed in various fashions amongst processing units and computer-readable mediums carried by tractor 224 and other processing units and associated computer-readable mediums remote from tractor 224 and in wireless communication with tractor 224.

Figure 9:
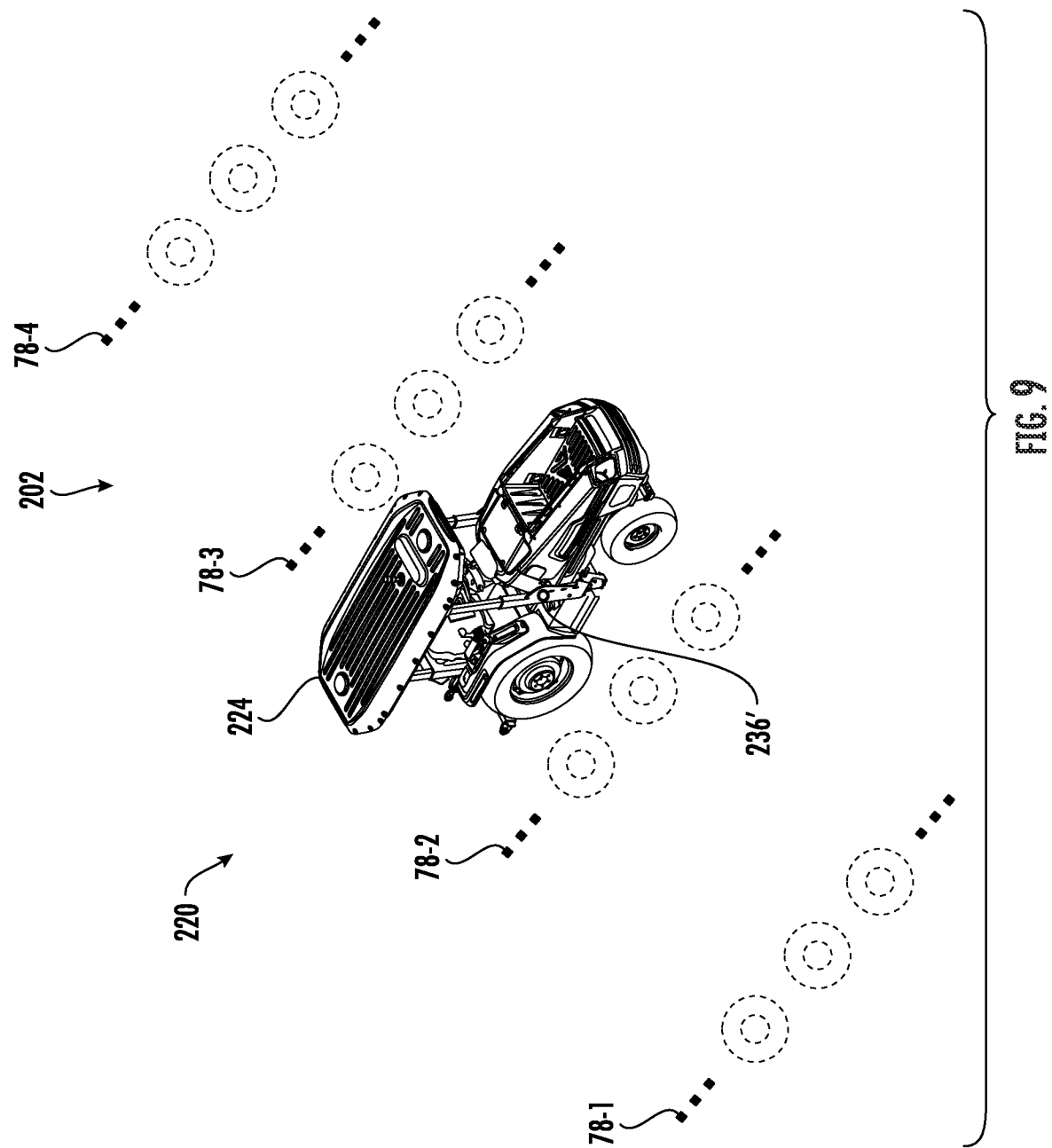
FIG. 9 is a right front perspective view of the plant locating system of FIG. 8 position between rows of plants.

FIG. 9 is a left front perspective view of plant locating system 220 and tractor 224 as tractor 224 is traveling through a field, orchard or vineyard 202 including rows 78-1, 78-2, 78-3 and 78-4 of plants. As shown by FIG. 9, tractor 224 may be provided with a second monocular camera 236' on the other side of tractor 224. Camera 236' may be supported at the same height and by the same structure as monocular camera 236 on the left side of tractor 224. Cameras 236 and 236' facilitate the concurrent capturing of sample images 70 of plants of interest 72 arranged in two different rows on opposite sides of tractor 224. As a result, plant locating unit 228 may concurrently locate or determine the geographic coordinates of plants of interest 72 in two different rows 78 on opposite sides of tractor 224 as tractor 224 travels along in between the consecutive rows 78. As a result, the mapping of different individual plants may be carried out in a timelier manner.

In some implementations, individual sample images captured by monocular cameras 236 and 236' may include multiple plants of interest in a first row of plants and multiple plants of interest in a second row of plants more distant from tractor 224 than the first row of plants. In such implementations, plant locating unit 228 may identify multiple selected portions 80 in the sample image, each selected portion 80 being associated with a different plant of interest 72. For each of the different selected portions 80 in the individual sample image 70, plant locating unit 228 may determine a distance between the particular plant of interest in the monocular camera based upon characteristics of the particular selected portion 80. Based upon the geographic location estimate of the GPS antenna at the time the sample image was captured by camera 236 or 236' and the determined distances between the monocular camera 236 or 236' in the particular plant of interest 72, plant locating unit 228 may concurrently determine the geographic coordinates or concurrently locate multiple different plants of interest in the same row or in multiple different rows from the single sample image, further enhancing the rate at which plants in a field, orchard or vineyard may be geographically located and mapped.

Figure 10:
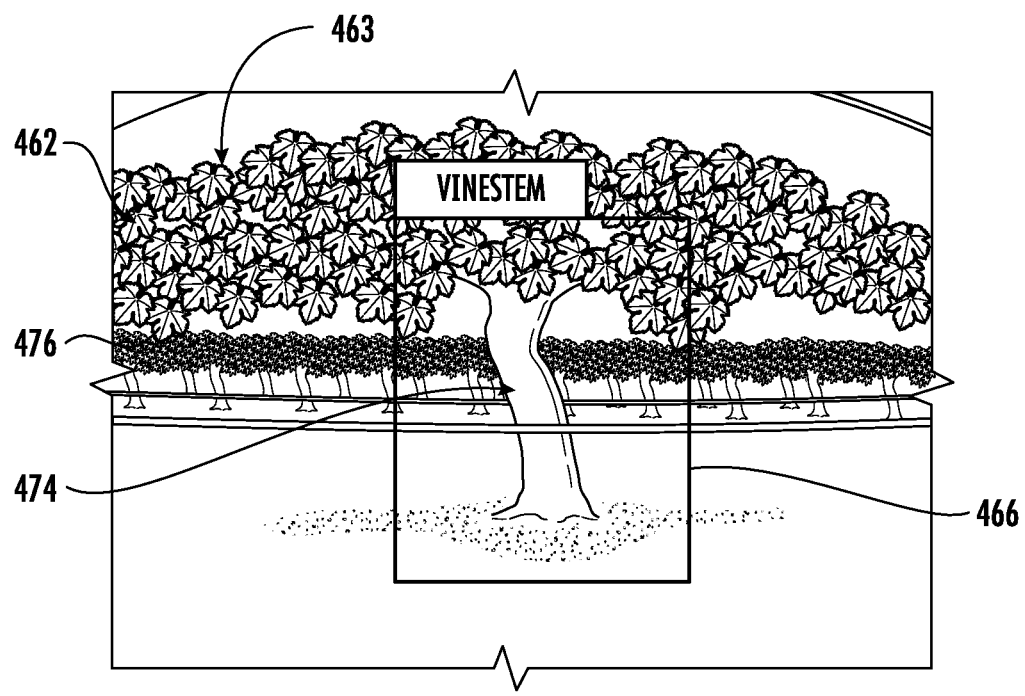
FIG. 10 is a diagram illustrating an example training image.

FIG. 10 illustrates an example training image 462, an example of a training image that may be part of set 260. Training image 462 depicts a training vine 463 having a stem 374 and a crown 376. FIG. 10 further illustrates an example training portion 466 which has been defined by a human based upon characteristics of the training plant 463. The training portion 466 has been defined so as to enclose the basil end of stem 474 and a juncture of stem 474 with crown 476. As described above with respect to system 220, set 260 may comprise a multitude of such sample images 462, wherein different sample images 462 may be taken or captured at different distances, with different lighting conditions, and with different plants having different sizes, stages of growth and the like.

Figure 11:
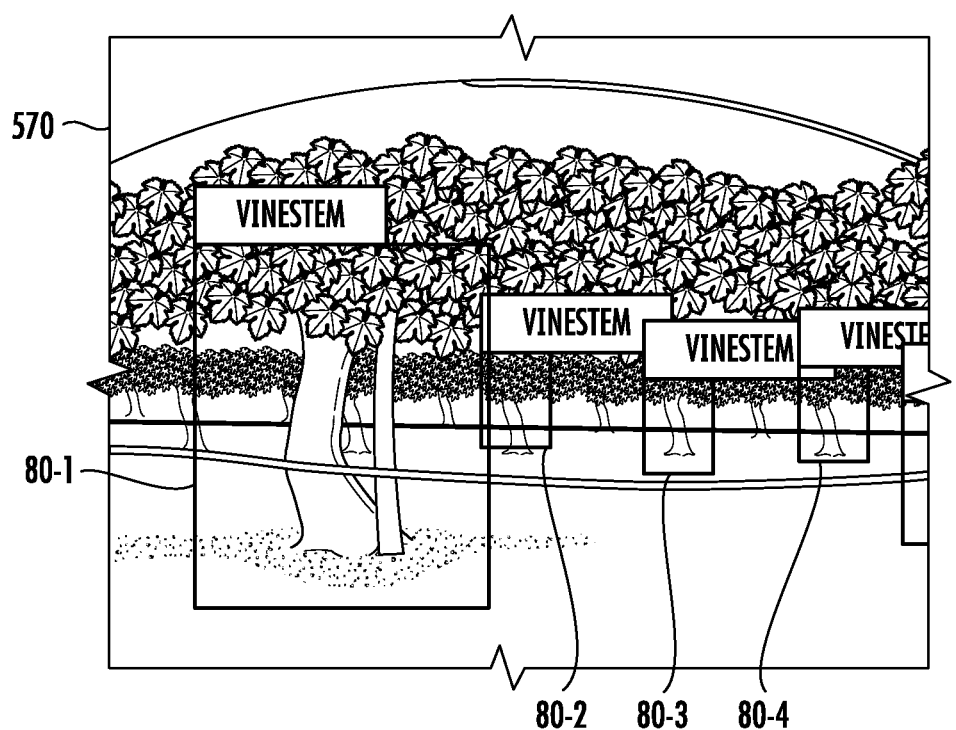
FIG. 11 is a diagram illustrating an example sample image of plants.

FIG. 11 illustrates an example sample image 570 captured by camera 236 of tractor 224. Sample image 570 depicts multiple plants of interest 72 in multiple different rows on one side of tractor 224. FIG. 11 further illustrates multiple selected portions 80-1, 80-2, 80-3, 80-4 and so on (collectively referred to as selected portions 80) in the same individual sample image 570 and surrounding the multiple different plants of interest 72. Selected portions 80 are identified by plant locating unit 228. In the example illustrated, plant locating unit 228 may utilize the GPS location of the GPS antenna 232 of tractor 224, the known relative positioning of GPS antenna to 232 and monocular camera 236, and analyzed characteristics of each selected portion 80 (such as the size of each selected portion 80 as well as the number of pixels contained within each selected portion 80) to determine the individual geographic locations or coordinates of each of the plants of interest 72 depicted in image 570 and having portions within an associated selected portion 80.

As shown by FIG. 11, sample image 570 includes multiple identified selected portions 80 of different plants of interest in different rows. During a first pass of tractor 224 along a first side of a row, a first sample image of a plant of interest may be captured by a camera 236, 236' and used, as described above with respect to method 100, to determine a first estimate for the geographic location, the coordinates of the plant of interest. During a second pass of tractor 224 along a second side of the row, opposite the first side, a second sample image of the plant of interest may be captured and used, as described above with respect to method 100, to determine a second estimate for the geographic location, the coordinates of the plant of interest. In some implementations, the first and second sample images may be captured using the same monocular camera 236, 236', wherein the first and second sample images are captured while the vehicle is moving in opposite directions. In some implementations, the first sample image may be captured using monocular camera 236 while the tractor 224 is moving in a first direction and the second sample image may be captured using the same monocular camera 236 while the tractor 224 is moving in a second opposite direction.

In such implementations, plant locating unit 228 may determine a third estimate for the geographic location of the plant of interest based upon a combination of the first estimate and the second estimate. For example, plant locating unit 228 may assign the plant of interest with a longitudinal coordinate that is the average of the longitudinal coordinates of the first and second estimates and a latitude coordinate that is the average of the latitudinal coordinates of the first and second estimates. In yet other implementations, other combinatorial techniques or statistical techniques may be used to use both of the first and second estimates to determine a third estimate for the geographic location of the plant of interest. In some implementations, greater than two separate sample images and greater than two geographic location estimates for a particular plant of interest may be used or combined to determine the final geographic location estimate for the plant of interest.

In some implementations plant locating system 220 may capture a first sample image of a plant of interest when tractor 224 is moving along or positioned between a first pair of rows of plants, wherein the first sample image is captured while the plant of interest is on a side of tractor 224, while the monocular camera 236, 236' used to capture the first sample image faces in a first direction. Using the first sample image, plant locating unit 228 may carry out method 100 to determine a first geographic location estimate for the plant of interest. During another pass of tractor 224 along or positioned between a second pair of rows of plants, the same camera 236, 236' may capture a second sample image of the same plant of interest while the plant of interest is on the same side of tractor 224, while the monocular camera 236, 236' used to capture the second sample image faces in the same first direction. The particular plant of interest may be farther away from camera 236, 236' in the second sample image as compared to the first sample image. Using the second sample image, plant locating unit 228 may carry out method 100 to determine a second geographic location estimate for the same plant of interest.

In such implementations, plant locating unit 228 may determine a third estimate for the geographic location of the plant of interest based upon a combination of the first estimate and the second estimate. For example, plant locating unit 228 may assign the plant of interest with a longitudinal coordinate that is the average of the longitudinal coordinates of the first and second estimates and a latitude coordinate that is the average of the latitudinal coordinates of the first and second estimates. In yet other implementations, other combinatorial techniques or statistical techniques may be used to use both of the first and second estimates to determine a third estimate for the geographic location of the plant of interest. In some implementations, greater than two separate sample images and greater than two geographic location estimates for a particular plant of interest may be used or combined to determine the final geographic location estimate for the plant of interest.

Figure 12:
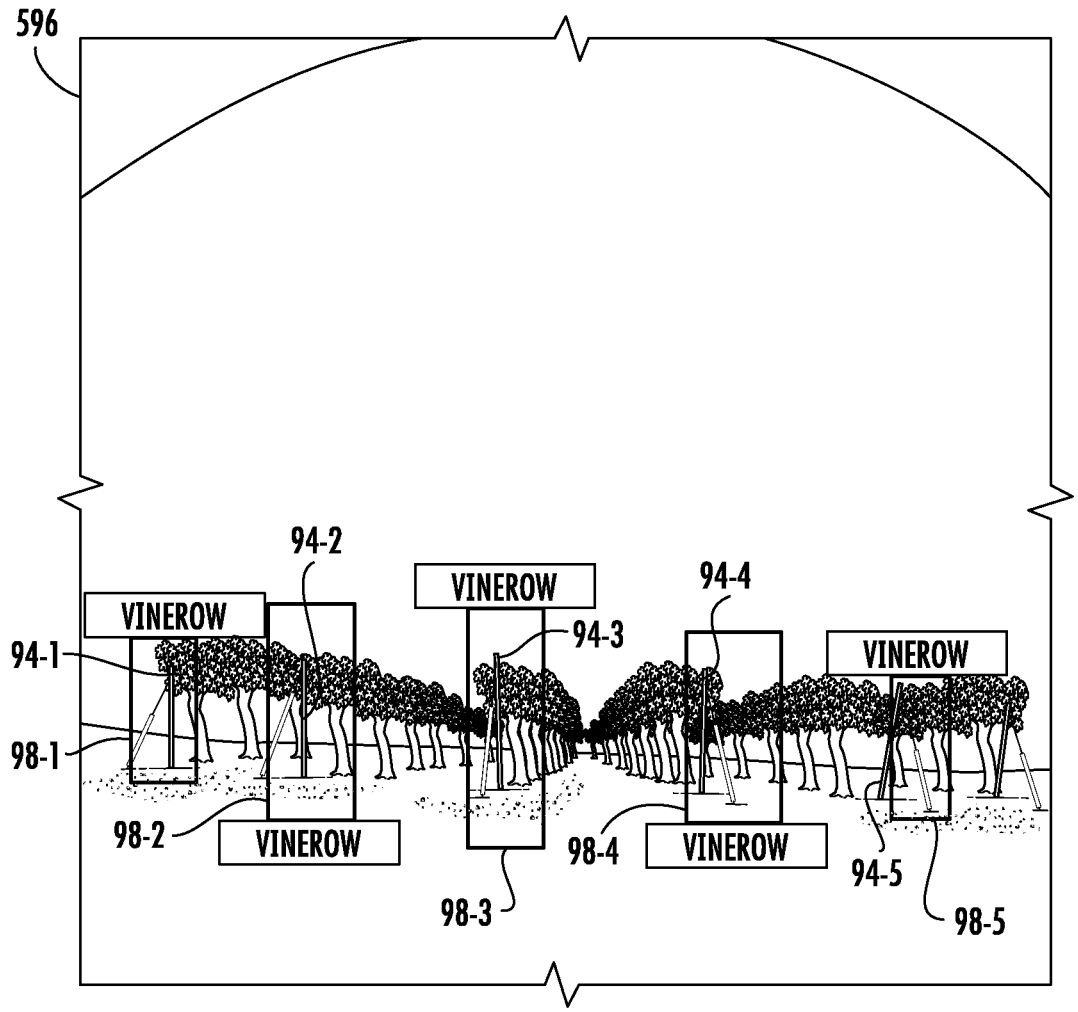
FIG. 12 is a diagram illustrating an example sample image of row ends.

FIG. 12 illustrates an example sample image 596 captured by camera 236 of tractor 224. Sample image 596 depicts multiple end row poles 94-1, 94-2, 94-3, 94-4, 94-5 (collectively referred to as poles 94). FIG. 11 further illustrates multiple selected portions 98-1, 98-2, 98-3, 98-4 and 98-5 (collectively referred to as selected portions 98) in the same individual sample image 596 and surrounding the multiple different poles 94. Selected portions 98 are identified by plant locating unit 228. In the example illustrated, plant locating unit 228 may utilize the GPS location of the GPS antenna 232 of tractor 224, the known relative positioning of GPS antenna to 232 and monocular camera 236, and analyzed characteristics of each selected portion 80 (such as the size of each selected portion 98 as well as the number of pixels contained within each selected portion 98) to determine the individual geographic locations or coordinates of each of the poles 94 depicted in image 596 and having portions within an associated selected portion 98, further enhancing the rate at which the ends of rows in a field, orchard or vineyard may be geographically located and mapped.

Figure 13:
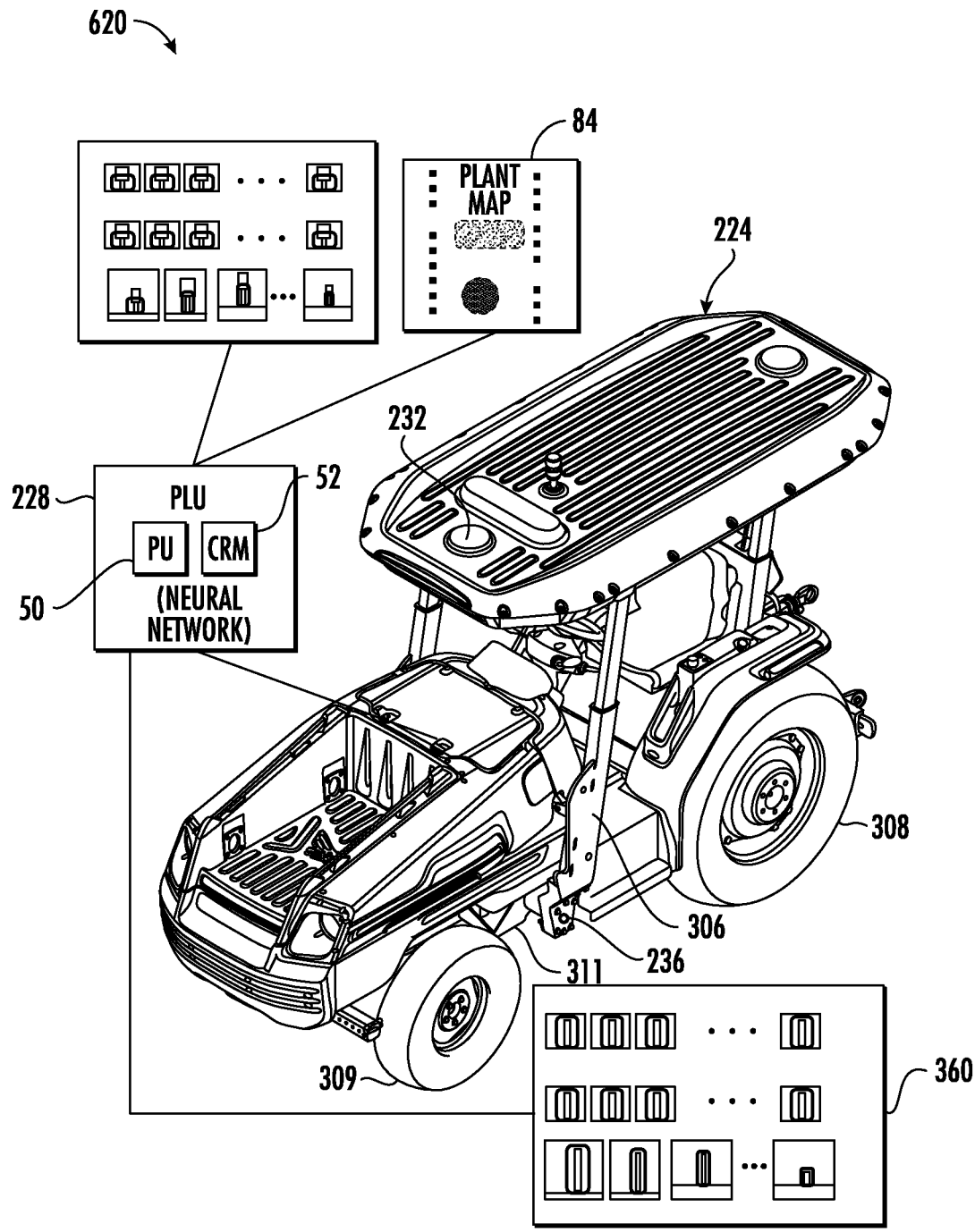
FIG. 13 is a left front perspective view of an example plant locating system including an example tractor.

FIG. 13 is a perspective view of an example plant locating system 620. Plant locating system 620 assembly plant locating system 220 except that camera 236 of tractor 224 is supported at a lower location on tractor 224. In the example illustrated, monocular camera 236 is supported at the lower end of column or post 306. In the example shown in FIG. 13, monocular camera 236 faces in a sideways or transverse direction generally parallel to the rotational axis of rear tires 308. The monocular camera shown in FIG. 13 is located between rear wheel 308 and front wheel 309 and below the top of front wheel 309, proximate the bottom of the chassis 311 of tractor 224. This lower relative positioning of camera 236 may facilitate the capturing of sample images that may better depict particular portions of the plant or multiple plants of interest. For example, this lower relative positioning a camera 236 (as to camera 236 in FIG. 8) may facilitate the capturing of the stem 74 of smaller plants of interest having a lower relative height. Those remaining components of plant locating system 620 which correspond to components of plant locating system 220 are numbered similarly.

Although each of the above examples is described in the context of locating and potentially mapping geographic locations of individual crop plants for customized management, in other implementations, the same methods and apparatus may likewise be used to locate and potentially map the geographic locations of non-crop plants and/or non-plant structures in a field, vineyard orchard. For example, the methods and apparatus may likewise be used to determine the geographic locations of weeds or groups of weeds in a field, vineyard or orchard. The methods and apparatus may likewise be used utilized to determine the geographic locations of obstructions or obstacles, such as rocks or the like in a field, vineyard or orchard. The potentially stored or mapped geographic locations of weeds may be used to specifically address such weeds through the application of herbicides, cultivation/tillage or subsequent planting decisions. The potentially stored or mapped geographic patient obstruction may be used to address such obstructions by controlling the positioning of an implement to avoid damage to the implant from the obstruction or to locate and subsequently remove the obstruction.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A plant locating system comprising:
   a vehicle supporting a Global Positioning System (GPS) antenna and a monocular camera facing in a sideways direction from the vehicle;
   a plant locating unit comprising:
      a processing unit; and
      a non-transitory computer-readable medium containing instructions to direct the processing unit to:
         acquire a sample image of a plant of interest captured at a time with the monocular camera at an unknown distance from the plant of interest;
         determine a geographic location estimate of the GPS antenna at the time, the selected portion;
         identify a selected portion of the sample image comprising the plant of interest;
         determine a distance between the plant of interest and the monocular camera based upon a size of the selected portion and a number of pixels within the selected portion; and
         determine a geographic location estimate of the plant of interest based on the geographic location estimate of the GPS antenna at the time and the determined distance between the monocular camera and the plant of interest.

2. The plant locating system of claim 1 further comprising a set of training images comprising images captured by the monocular camera, each of the training images comprising a training portion, wherein the processing unit identifies the selected portion of the sample image based upon the training portion of each of the training images.

3. The plant locating system of claim 2, wherein the training portion of each of the training images and the selected portion of the sample image each comprise a window containing and larger than the plant of interest.

4. The plant locating system of claim 3, wherein the training portion of each of the training images is human defined.

5. The plant locating system of claim 1, wherein the selected portion comprises a window that is larger than and contains the plant of interest in the sample image and wherein the distance between the plant of interest in the monocular camera is based upon a size of the window and a number of image pixels within the window.

6. The plant locating system of claim 5, wherein the window extends from a basal end of a stem of the plant of interest to where the plant of interest branches outwardly from the stem of the plant of interest.

7. The plant locating system of claim 1, wherein the processing unit and the non-transitory computer-readable medium form a neural network that learns how to identify the selected portion of the sample image comprising the plant of interest from a corresponding training portion in each image of a training set of images of plants captured by the monocular camera.

8. The plant locating system of claim 1, wherein the instructions are to direct the processing unit to determine a second geographic location estimate of a second plant of interest and to form a map comprising the geographic location estimate of the plant of interest and the second geographic location estimate of the second plant of interest.

9. The plant locating system of claim 1, wherein the instructions are to direct the processing unit to:
  acquire a second sample image of the plant of interest captured at a second time with the monocular camera at an unknown distance from the plant of interest;
  determine a second geographic location estimate of the GPS antenna at the second time;
  identify a selected portion of the second sample image comprising the plant of interest;
  determine a second distance between the plant of interest and the monocular camera based upon the second selected portion; and
  determine a second geographic location estimate of the plant of interest based on the geographic location estimate of the GPS antenna at the second time and the determined distance between the monocular camera and the plant of interest; and
  determine a third geographic location estimate of the plant of interest based upon a combination of the geographic location estimate of the plant of interest and the second geographic location estimate of the plant of interest.

10. The plant locating system of claim 1, wherein the monocular camera is vertically spaced above lowermost ground engaging portions of the vehicle by distance of no greater than 110 cm.

11. The plant locating system of claim 1, wherein the instructions are to direct the processing unit to:
  acquire a second sample image of a second plant of interest captured at a second time with the monocular camera at an unknown distance from the plant of interest, wherein the plant of interest of the second plant of interest are part of a row of plants;
  determine a second geographic location estimate of the GPS antenna at the second time;
  identify a second selected portion of a second sample image comprising the second plant of interest;
  determine a distance between the second plant of interest and the monocular camera based upon the second selected portion;
  determine a second geographic location estimate of the second plant of interest based on the geographic location estimate of the GPS antenna at the second time and the determined distance between the monocular camera and the second plant of interest; and
  determine existence of a plant omission between the plant of interest and of the second plant of interest based on the geographic location estimate of the plant of interest and the second geographic location estimate of the second plant of interest.

12. The plant locating system of claim 11, wherein the instructions are to direct the processing unit to form a map comprising the geographic location estimate for the plant of interest, the second geographic location estimate for the second plant of interest and a third geographic location for the plant omission.

13. The plant locating system of claim 1, wherein the instructions are to direct the processing unit to output control signals to position the vehicle relative to the plant of interest based upon the geographic location estimate for the plant of interest.

14. The plant locating system of claim 1, wherein the instructions are to direct the processing unit to output control signals to carry out an operation on the plant of interest based upon the geographic location estimate for the plant of interest.

15. The plant locating system of claim 1, wherein the instructions are to direct the processing unit to form an evaluation of the plant of interest and to associate the evaluation with the geographic location estimate for the plant of interest.

16. A plant locating system comprising:
  a vehicle supporting a Global Positioning System (GPS) antenna and a monocular camera facing in a sideways direction from the vehicle;
  a plant locating unit comprising:
    a processing unit; and
    a non-transitory computer-readable medium containing instructions to direct the processing unit to:
      acquire a sample image of a plant of interest captured at a time with the monocular camera at an unknown distance from the plant of interest;
      determine a geographic location estimate of the GPS antenna at the time, the selected portion;
      identify a selected portion of the sample image comprising the plant of interest;
      determine a distance between the plant of interest and the monocular camera based the selected portion; and
      determine a geographic location estimate of the plant of interest based on the geographic location estimate of the GPS antenna at the time and the determined distance between the monocular camera and the plant of interest, wherein the plant of interest is in a first row of plants, wherein sample image comprises depicts the plant of interest and a second plant of interest in a second row of plants and wherein the instructions are to direct the processing unit to:
  identify a second selected portion of the sample image comprising the second plant of interest;
  determine a distance between the second plant of interest and the monocular camera based upon the second selected portion; and
  determine a geographic location estimate of the second plant of interest based on the geographic location estimate of the GPS antenna at the time and the determined distance between the monocular camera and the second plant of interest.

17. The plant locating system of claim 16, wherein the selected portion comprises a first window having a first size and wherein the second selected portion comprises a second window having a second size different than the first size, wherein differences in size between the window and the second window are a function of different distances from the monocular camera.

18. The plant locating system of claim 17, wherein the distance between the plant of interest and the monocular camera is based upon the first size of the first window and a number of image pixels within the first window and wherein the distance between the second plant of interest and the monocular camera is based upon the second size of the second window and a number of image pixels within the second window.

19. A plant locating system comprising:
a vehicle supporting a Global Positioning System (GPS) antenna and a monocular camera facing in a sideways direction from the vehicle;
a plant locating unit comprising:
a processing unit; and
a non-transitory computer-readable medium containing instructions to direct the processing unit to:
acquire a sample image of a plant of interest captured at a time with the monocular camera at an unknown distance from the plant of interest;
determine a geographic location estimate of the GPS antenna at the time, the selected portion;
identify a selected portion of the sample image comprising the plant of interest;
determine a distance between the plant of interest and the monocular camera based the selected portion;
determine a geographic location estimate of the plant of interest based on the geographic location estimate of the GPS antenna at the time and the determined distance between the monocular camera and the plant of interest,
acquire a second sample image of the plant of interest captured at a second time with the monocular camera at an unknown distance from the plant of interest;
determine a second geographic location estimate of the GPS antenna at the second time;
identify a selected portion of the second sample image comprising the plant of interest;
determine a second distance between the plant of interest and the monocular camera based upon the second selected portion; and
determine a second geographic location estimate of the plant of interest based on the geographic location estimate of the GPS antenna at the second time and the determined distance between the monocular camera and the plant of interest; and
determine a third geographic location estimate of the plant of interest based upon a combination of the geographic location estimate of the plant of interest and the second geographic location estimate of the plant of interest.

20. A plant locating system comprising:
a vehicle supporting a Global Positioning System (GPS) antenna and a monocular camera facing in a sideways direction from the vehicle;
a plant locating unit comprising:
a processing unit; and
a non-transitory computer-readable medium containing instructions to direct the processing unit to:
acquire a sample image of a plant of interest captured at a time with the monocular camera at an unknown distance from the plant of interest;
determine a geographic location estimate of the GPS antenna at the time, the selected portion;
identify a selected portion of the sample image comprising the plant of interest;
determine a distance between the plant of interest and the monocular camera based the selected portion;
determine a geographic location estimate of the plant of interest based on the geographic location estimate of the GPS antenna at the time and the determined distance between the monocular camera and the plant of interest,
acquire a second sample image of a second plant of interest captured at a second time with the monocular camera at an unknown distance from the plant of interest, wherein the plant of interest of the second plant of interest are part of a row of plants;
determine a second geographic location estimate of the GPS antenna at the second time;
identify a second selected portion of a second sample image comprising the second plant of interest;
determine a distance between the second plant of interest and the monocular camera based upon the second selected portion;
determine a second geographic location estimate of the second plant of interest based on the geographic location estimate of the GPS antenna at the second time and the determined distance between the monocular camera and the second plant of interest; and
determine existence of a plant omission between the plant of interest and of the second plant of interest based on the geographic location estimate of the plant of interest and the second geographic location estimate of the second plant of interest.

21. The plant locating system of claim 20, wherein the instructions are to direct the processing unit to form a map comprising the geographic location estimate for the plant of interest, the second geographic location estimate for the second plant of interest and a third geographic location for the plant omission.

* * * * *